United States Patent Office 3,435,038
Patented Mar. 25, 1969

3,435,038
5,6,7,9,10,14b-HEXAHYDROISOQUINOLO [2,1-d] BENZO [1,4] DIAZEPINES
Goetz E. Hardtmann, Madison, and Hans Ott, Convent Station, N.J., assignors to Sandoz Inc., Hanover, N.J.
No Drawing. Filed June 1, 1965, Ser. No. 460,574
Int. Cl. C07d 57/00, 53/06; A61k 27/00
U.S. Cl. 260—286
12 Claims

ABSTRACT OF THE DISCLOSURE

The compounds are of the class of 5,6,7,9,10,14b-hexahydroisoquinolo[2,1-d]benzo[1,4]diazepines and are useful as anti-inflammatories. The compounds may be obtained by reduction of appropriate 5,6,7,9,10,14b-hexahydroisoquinolo[2,1-d]benzo[1,4]diazepin-6-ones or 5,6,7,9,10,14b-hexahydroisoquinolo[2,1-d]benzo[1,4]-diazepine-6-thiones.

---

The present invention is directed to pharmaceutically acceptable 5,6,7,9,10,14b-hexahydro-isoquinolo[2,1-d]benzo[1,4]diazepines, particularly those of the formula

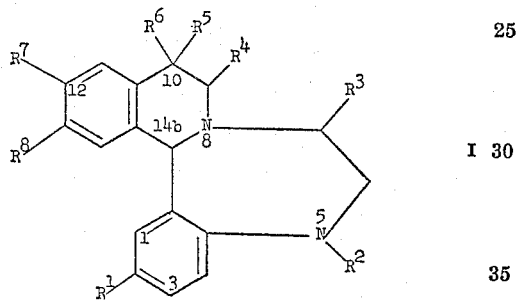

I wherein $R^1$ is either a hydrogen atom (—H); lower alkyl, e.g. methyl, ethyl, propyl, isopropyl and butyl; a halogen atom, e.g. a fluorine atom (—F); a chlorine atom (—Cl) and a bromine atom (—Br); amino (—NH$_2$); di(lower)alkylamino, both alkyls of which are alike, e.g. dimethylamino; or trifluoromethyl (—CF$_3$);
$R^2$ is either a hydrogen atom (—H); lower alkyl, e.g. methyl, ethyl, propyl, isopropyl and butyl; benzyl; or di(lower)alkylamino(lower) alkyl, e.g. γ-(N-methyl-N-ethyl)-aminopropyl and β-(N,N-dimethyl)-aminopropyl;
each of $R^3$, $R^4$, $R^5$ and $R^6$ is either a hydrogen atom (—H); or straight chain lower alkyl, e.g. methyl, ethyl, propyl and butyl; and
each of $R^7$ and $R^8$ is, independently, either a hydrogen atom (—H), methoxy (—OCH$_3$) or, taken together, methylenedioxy (—O—CH$_2$—O—); and acid addition salts thereof. When one of $R^3$ and $R^4$ is lower alkyl, the other is a hydrogen atom. Additionally, when $R^4$ is lower alkyl (preferably methyl, ethyl or propyl), each of $R^5$ and $R^6$ is, independently, either a hydrogen atom or methyl.

Among the pharmaceutically acceptable acid addition salts are salts of organic acids, e.g. tartaric acid; inorganic acids, e.g. hydrochloric acid, hydrobromic acid and sulfuric acid; monobasic acids, e.g. an alkylsulfonic acid, such as methanesulfonic acid (H$_3$C—SO$_3$H); dibasic acids, e.g. tartaric acid and succinic acid; tribasic acids, e.g. phosphoric acid and citric acid; saturated acids, e.g. acetic acid; ethylenically unsaturated acids, e.g. maleic acid and fumaric acid; and aromatic acids, e.g. salicylic acid and arylsulfonic acids, such as benzenesulfonic acid. The only limitation on the acid selected is that the resulting acid addition salt be pharmaceutically acceptable; the acid does not nullify the therapeutic properties of compounds I. It is preferred, however, to select an acid so that the salt therewith is water-soluble; tartaric acid and succinic acid are preferred for this purpose.

Compounds I are prepared by a number of routes:

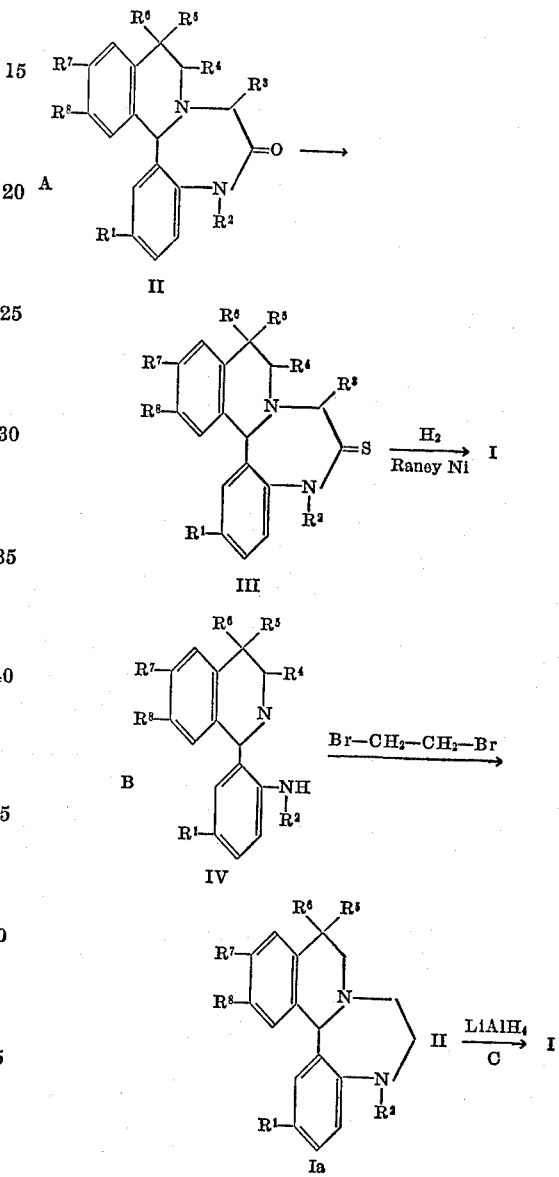

The preferred route is reaction C. Compounds II and IV are prepared either from known starting materials or from starting materials which are readily prepared by the art-skilled according to known procedures and from known materials. The preferred manner of preparing all compounds II and IV is illustrated in Examples 1 to 5, 7 and 11. Compound II wherein $R^2$ is lower alkyl (or hydrogen) is a precursor (reactions A and C) of the corresponding compound I. Such compounds II are, alternatively, prepared according to the procedure illustrated by Example 6.

The first step of reaction A is illustrated by Example 12. The subsequent hydrogenation is conducted in the same manner as described by Whalley et al., J.A.C.S., 77, 745 (1955). The process corresponding to reaction B is reported by J. v Braun, Chem. Ber., 70, 979 (1937).

Compounds II and IV have at least one asymmetric carbon atom (present also in compounds I derived therefrom). Racemates are resolved by known procedures into their optical antipodes (enantiomers). Those compounds having two or more asymmetric carbon atoms further exist as geometric isomers, which are separable into cis and trans forms according to established procedures. The isolation of chemical individuals among the stereoisomers of compounds I does not constitute an essential part of this invention, but the chemical individuals are within the scope of said invention. When a chemical individual II is employed as an intermediate, the corresponding chemical individual I results. Likewise, specific stereoisomers of compounds II are prepared from the corresponding intermediates. Racemates of compounds IV are resolved by preparing the corresponding tartrate from an enantiomer of tartaric acid. Other optically active acids may also be used.

The pharmaceutically acceptable acid addition salts are prepared according to standard well-known procedures.

Typical free bases of compounds I are enumerated by the definition of substituents in the following table:

FREE BASES OF COMPOUNDS I

| $R^1$ | $R^2$ | $R^3$ | $R^4$ | $R^5$ | $R^6$ | $R^7$ | $R^8$ |
|---|---|---|---|---|---|---|---|
| —H | —Be | —Bu | —H | —H | —Et | —H | —H |
| —Me | —Et | —H | —Pr | —H | —H | —OMe | —H |
| —Et | —EA(Me)$_2$ | —Me | —H | —Me | —Me | —H | —OMe |
| —Pr | —PA(Et)$_2$ | —Me | —H | —Et | —H | —O—CH$_2$—O— | |
| —iPr | —EA(Me)Et | —H | —Me | —Me | —Me | —H | —H |
| —Cl | —PA(Me)$_2$ | —Et | —H | —Et | —H | —OMe | —H |
| —F | —H | —H | —Et | —H | —Me | —H | —OMe |
| —Cl | —Me | —Me | —H | —H | —Pr | —OMe | —OMe |
| —Br | —Et | —Pr | —H | —Me | —H | —O—CH$_2$—O— | |
| —NH$_2$ | —Pr | —Bu | —H | —H | —H | —H | —H |
| —N(Et)$_2$ | —iPr | —H | —H | —Et | —Me | —OMe | —H |
| —N(Me)$_2$ | —Bu | —H | —H | —Pr | —H | —H | —OMe |
| —CF$_3$ | —Me | —H | —H | —Bu | —H | —O—CH$_2$—O— | | wherein, in addition to standard elemental symbols, the following abbreviations are employed:

| | | | |
|---|---|---|---|
| Be | Benzyl. | iPr | Isopropyl. |
| Bu | Butyl. | Me | Methyl. |
| EA | Ethylamino. | PA | Propylamino. |
| Et | Ethyl. | Pr | Propyl. |

All compounds I wherein $R^5$ and $R^6$ are different and/or $R^3$ and/or $R^4$ is other than a hydrogen atom exist in different geometric isomeric forms; all compounds I exist as racemates or the corresponding enantiomers. The chemical individuals and their pharmaceutically acceptable acid addition salts, as well as racemates thereof, are well within the scope of this invention.

Compounds I are useful as anti-inflammatories. They are administered either orally or parenterally in daily doses of from 10 milligrams to 500 milligrams.

Each of the pharmaceutically active compounds of this invention, may be, e.g., incorporated, for oral administration, in a tablet as the sole active ingredient. A typical tablet is constituted by from 1 to 3 percent binder, e.g., tragacanth; from 3 to 10 percent disintegrating agent, e.g., corn starch; from 2 to 10 percent lubricant, e.g., talcum; from 0.25 to 1.0 percent lubricant, e.g., magnesium stearate; an average dosage of active ingredient; and q.s. 100 percent of filler, e.g., lactose; all percentages being by weight. Tablets are prepared according to standard tabletting techniques, which are well-known in the art, employing the necessary amounts of conventional granulating liquids, e.g., alcohol SD–30 and purified water. An exemplary tabletting formulation for the instant active compounds is:

| | Parts |
|---|---|
| Title compound of Example 7 | 58 |
| Tragacanth | 2 |
| Lactose | 31.5 |
| Corn starch | 5 |
| Talcum | 3 |
| Magnesium stearate | 0.5 |
| Alcohol SD–30 } Purified water } | q.s. |

The following examples illustrate the invention, all temperatures being in degrees centigrade, parts and percentages being by weight unless otherwise specified, and the relationship between parts by weight and parts by volume being the same as that between the kilogram and the liter.

EXAMPLE 1

N-(β-phenethyl)-2-nitrobenzamide

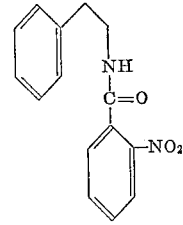

To 3 parts of β-phenethylamine and 1.1 parts of sodium hydroxide (in 7 parts by volume of water) add dropwise (with vigorous stirring) 5 parts of o-nitro-benzoyl chloride within a period of 30 minutes and at a temperature of from 35° to 40°. Continue stirring for an additional thirty minutes.

Filter off the crystalline reaction product (title compound), and recrystallize same from benzene to obtain white prisms, melting point (M.P.) 117°. [See Rodionov, V. M., and Yavorskaya, E. V., "J. Gen. Chem." (USSR), 13, 491, 1943; and "C.A.," 38, 3285[2].]

EXAMPLE 2

1-(2-nitro-phenyl)-3,4-dihydroisoquinoline

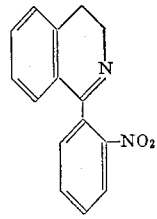

Add 12 parts of phosphorus pentoxide (P$_2$O$_5$) to a solution of 5 parts of N-(β-phenethyl)-2-nitrobenzamide in 25 parts by volume of xylene and reflux the resulting reaction mixture for two hours.

Thereafter evaporate the organic solvent in vacuo, and then decompose the sticky residue with ice water. Extract the obtained water layer with diethylether to remove residual starting material. Then make the extracted water layer alkaline with concentrated sodium hydroxide.

Filter off the resulting crystalline title compound, and recrystallize same from diethylether/pentane to obtain yellow prisms, M.P. 86° to 87°. [See "C.A.," 38, 3285², supra.]

EXAMPLE 3

1-(2-aminophenyl)-1,2,3,4-tetrahydroisoquinoline

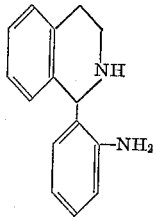

Catalytically hydrogenate (0.5 part of platinum catalyst) a solution of 10 parts of 1-(2-nitrophenyl)-3,4-dihydroisoquinoline in 20 parts by volume of acetic acid and 100 parts by volume of ethanol under a pressure of 40 p.s.i.g. Filter off the catalyst and evaporate the filtrate in vacuo to dryness Distribute the residue between aqueous sodium bicarbonate and methylenechloride.

Dry the resulting organic phase, evaporate the solvent, and crystallize the residue from ethanol/water to obtain the title compound as white prisms, M.P. 107°. [See "C.A.," 38, 3825², supra.]

EXAMPLE 4

1-(2-aminophenyl)-2-carboxymethyl-1,2,3,4-tetrahydroisoquinoline

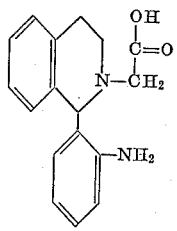

Reflux for 2.5 hours a mixture of 2 parts of 1-(2-aminophenyl)-1,2,3,4-tetrahydroisoquinoline, 3 parts of ethyl bromoacetate and 1 part of triethylamine in 10 parts by volume of ethanol. Evaporate the resulting solution to dryness; dissolve the residue in 20 parts by volume of ethanol and 10 parts by volume of 2 N sodium hydroxide; and heat the obtained solution one hour at 60°.

Add to the thus-heated product 10 parts by volume of 2 N hydrochloric acid. Then evaporate the ethanol in vacuo to crystallize out the title compound.

EXAMPLE 5

5,6,7,9,10,14b-hexahydro-isoquinolo[2,1-d]benzo[1,4]diazepin-6-one

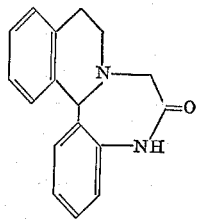

Heat crude 1-(2-aminophenyl)-2-carboxymethyl-1,2,3, 4-tetrahydroisoquinoline at 160° for 30 minutes. Recrystallize the crystalline residue from ethanol to obtain the tetracyclic title compound II.

Replacing the o-nitro-benzoyl chloride of Example 1 with an equivalent of 5-chloro-2-nitro-benzoyl chloride and conducting the product through the steps of Examples 2 through 5 results in the preparation, in the same manner, of the 2-chloro-analogue.

EXAMPLE 6

2-chloro-5-ethyl-5,6,7,9,10,14b-hexahydro-isoquinolo[2,1-d]benzo[1,4]diazepin-6-one

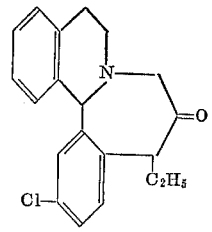

Dissolve 6 parts of 2-chloro-5,6,7,9,10,14b-hexahydro-isoquinolo[2,1-d]benzo[1,4]diazepin-6-one in 25 parts by volume of purified DMF. Add at once to the obtained solution 1.03 parts of sodium hydride (56% in mineral oil) and heat the resulting mixture to 90° to 100°.

While stirring the white cloudy solution which results after about 30 minutes, add thereto 3.56 parts of ethyl iodide in 5 parts by volume of purified DMF over a period of about 1 hour. Then maintain the resulting mixture at from 90° to 100° for an additional 90 minutes.

Evaporate the solvent in vacuo. Dissolve the residue in 150 parts by volume of chloroform, wash twice with 75 parts by volume of water, dry over sodium sulfate, filter and evaporate the chloroform under reduced pressure.

The resulting brown oil (6.8 parts) crystallizes from 80 parts by volume of 95% ethanol on standing at 0°. Filter the crystals and wash same with 10 parts by volume of ethanol. There are thus obtained 5.7 parts of title compound, M.P. 168° to 170°. After two successive crystallizations from ethanol the melting point is 171° to 173°.

Replacing the 2-chloro-5,6,7,9,10,14b-hexahydro-isoquinolo[2,1-d]benzo[1,4]diazepin-6-one with an equivalent of the title compound of Example 5 results in the preparation, in similar manner, of the corresponding deschloro compound.

EXAMPLE 7

(+)-2-chloro-5-methyl-5,6,7,9,10,14b-hexahydro-isoquinolo[2,1-d]benzo[1,4]diazepine tartrate

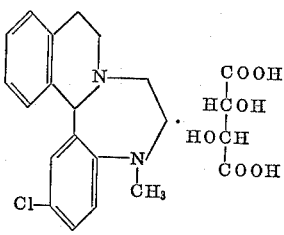

Heat a mixture of 2 parts of 5-chloro-N-methyl-isotoic anhydride and 3 parts of β-phenethylamine in 10 parts by volume of dioxane for 15 minutes on a water bath, whereby vigorous carbon dioxide evolution takes place. Add water to the obtained solution to precipitate N-(β-phenethyl)-2-methyl-amino-5-chloro-benzamide, M.P. 129° to 131°.

Add 1 parts of p-toluenesulfonyl chloride to the solution of 1 part of N-(β-phenethyl) - 2 - methylamino-5-chloro-benzamide in 5 parts by volume of pyridine and heat the obtained mixture at 60° for 1.5 hours. Evaporate the resultant in vacuo, add 3 parts by volume of acetone and 1 mixture for 30 minutes. After evaporation of the acetone, add ethyl acetate thereto and extract the organic layer thoroughly with dilute hydrochloric acid and sodium bicarbonate solution. Dry the organic phase over sodium sulfate and evaporate to dryness to obtain the tosylate of N-(β-phenethyl)-2-methylamino - 5 - chloro-benzamide as an oily residue.

Dissolve the thus-obtained crude tosylate in 10 parts by volume of xylene, and add 4 parts of the phosphorus pentoxide to the resulting solution. Reflux the thus-produced reaction mixture over night (15 hours). Evaporate the xylene in vacuo and decompose the sticky residue by addition of ice thereto. Make the resulting aqueous mixture alkaline with concentrated aqueous sodium hydroxide solution and extract the alkaline product with methylene chloride. After drying and evaporating the organic solvent, dissolve the oily residue in diethylether and precipitate the hydrochloride of 1-(2-methyltosylamino-5-chlorophenyl)-3,4-dihydroisoquinoline, M.P. 240° to 241°, by bubbling hydrogen chloride gas through the obtained ether solution.

Gradually add 4 parts by volume of concentrated sulfuric acid under cooling to 1 part of the thus-prepared hydrochloride and maintain the obtained solution at room temperature over night. Pour said solution on ice; make it alkaline with sodium hydroxide; and extract the alkaline solution with methylene chloride. Dry and evaporate the organic solvent to obtain 1-(2-methylamino-5-chlorophenyl)-3,4-dihydroisoquinoline as an oily residue.

Catalytically hydrogenate (0.02 part of platinum catalyst) a solution of 1 part of the last-described 1-(2-methylamino - 5 - chlorophenyl) - 3,4 - dihydroisoquinoline (as an oily residue) in 8 parts by volume of acetic acid at room temperature and under atmospheric pressure. Filter off the catalyst, evaporate the filtrate in vacuo; dissolve the residue in methylene chloride; and shake the resulting solution with dilute (aq.) sodium hydroxide solution. After drying and concentrating the organic layer, add pentane thereto to crystallize 1-(2-methylamino-5-chlorophenyl) - 1,2,3,4 - tetrahydroisoquinoline as white prisms, M.P. 141° to 143°.

Add a solution of 8.25 parts of D(+)-tartaric acid in 100 parts by volume of ethanol to a solution of 15 parts of (±)-1-(2-methylamino-5-chlorophenyl)-1,2,3,4-tetrahydroisoquinoline in 200 parts by volume of ethanol and 100 parts by volume of methylene chloride. On concentrating this mixture, only the tartrate of the (+) base crystallizes.

Filter off the precipitate and free the base from this salt by distributing the filtrate between methylene chloride and dilute aqueous sodium hydroxide solution; dry the organic phase and evaporate the solvent in vacuo. Crystallize the residual crude base from ethanol to obtain (+) - 1 - (2 - methylamino - 5 - chlorophenyl) - 1,2,3,4-tetrahydroisoquinoline, $[\alpha]^{20}_{546}=+27.3°$ (c.=2, in ethanol).

Evaporate the filtrate of the tartrate of the (+)-base to dryness in vacuo and distribute the residue between methylene chloride and dilute aqueous sodium hydroxide solution. Dry the organic phase and evaporate the solvent therefrom in vacuo. Transfer the residue, consisting essentially of the (−)-base, in exactly the same way as described above to the crystalline L(−)-tartrate by addition of L(−)-tartaric acid. The free base (−)-1-(2-methylamino - 5 - chlorophenyl) - 1,2,3,4 - tetrahydroisoquinoline, prepared from the tartrate as described for the (+)-base, has $[\alpha]^{20}_{546}=-27.8°$ (c.=2, in ethanol).

Reflux the mixture of 8 parts of (+)-1-(2-methylamino - 5 - chlorophenyl) - 1,2,3,4 - tetrahydroisoquinoline, 10 parts of ethyl bromoacetate and 6.5 parts of triethylamine in 75 parts by volume of ethanol for two hours. Evaporate the obtained solution to dryness; dissolve the residue in 80 parts by volume of ethanol and 32 parts by volume of 2 N sodium hydroxide, and heat this solution 1 hour to 60°. Evaporate the alcohol in vacuo, whereby a small amount of starting material crystallizes out and is filtered off. On addition of 32 parts by volume of 2 N hydrochloric acid, (+)-1-(2-methylamino-5-chlorophenyl) - 2 - carboxymethyl - 1,2,3,4 - tetrahydroiso- quinoline precipitates out, $[\alpha]^{20}_{546}=+64.5°$ (c.=3, in ethanol).

Heat the precipitated 1-(2-methylamino-5-chlorophenyl) - 2 - carboxymethyl - 1,2,3,4 - tetrahydroisoquinoline at 140° for 1 hour. Dissolve the product in acetone, and precipitate the hydrochloride of (+)-2-chloro-5-methyl-5,6,7,9,10,14b - hexahydro - isoquinolo[2,1 - d]benzo[1,4]diazepin-6-one, $[\alpha]^{20}_{546}=+310°$ (c.=2, in water) by bubbling dry hydrogen chloride gas in the resulting acetone solution.

Precipitate the free base from an aqueous solution of the hydrochloride by addition thereto of sodium hydroxide. Recrystallize the free base from ethanol/water.

In a Soxhlet apparatus place 10 parts of (+)-2-chloro-5 - methyl - 5,6,7,9,10,14b - hexahydro - isoquinolo[2,1-d]benzo[1,4]diazepin-6-one in the Soxhlet thimble prior to refluxing for 20 hours 300 parts by volume of absolute diethylether in the Soxhlet flask containing 10 parts of lithium aluminum hydride (LiAlH₄). All of the compound in the thimble is dissolved prior to the termination of this time.

Destroy any excess lithium aluminum hydride with water (nitrogen atmosphere). Thereafter, add to the refluxed material 200 parts by volume of diethylether and 100 parts by volume of benzene. Extract the resultant mixture with saturated aqueous sodium chloride solution. Separate the obtained organic phase, dry same over sodium sulfate, and evaporate in vacuo to obtain 9.5 parts of yellow oil, which is the free base of the title compound.

Dissolve the oil in 50 parts by volume of ethanol. Mix the thus-produced solution with a solution of 5 parts of d-tartaric acid in 50 parts by volume of absolute ethanol. A crystalline salt precipitates at once. Filter off the salt and dry same to obtain 13 parts of title compound. Recrystallize from acetone to obtain 11.8 parts of title compound, M.P. 132° to 133°, $[\alpha]^{20}_{546}=+300°$ (c.=1, in ethanol).

Replacing the d-tartaric acid (in the last-preceding paragraph) with either l-tartaric acid or i-tartaric acid results in the preparation, in the same manner, of the corresponding tartrate.

Replacing the (+)-2-chloro-5-methyl-5,6,7,9,10,14b-hexahydroisoquinolo[2,1 - d]benzo[1,4]diazepin - 6 - one by an equivalent of its enantiomer results in the preparation, in similar manner, of the enantiomer of the title compound, M.P. 129° to 132°, $[\alpha]^{20}_{546}=-296°$ (c.=1, in ethanol).

EXAMPLE 8

Racemic 2-chloro-5-methyl-5,6,7,9,10,14b-hexahydro-isoquinolo[2,1-d]benzo[1,4]diazepine

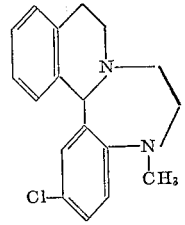

In a Soxhlet apparatus place 15 parts of racemic 2-chloro - 5 - methyl-5,6,7,9,10,14b-hexahydro-isoquinolo [2,1-d]benzo[1,4]diazepin-6-one in the thimble; place 5 parts of lithium aluminum hydride and 250 parts by volume of diethylether in the flask; and reflux the ether for 15 hours. The refluxing ether completely dissolves all of the material in the thimble and transports it into the flask during this period.

Introduce 28 parts by volume of water (with concurrent introduction of nitrogen) into the flask slowly to destroy excess lithium aluminum hydride. Thereafter, add to the contents of the flask 100 parts by volume of benzene and 200 parts by volume of 10% (aq.) sodium hydroxide solution. Shake the resultant, and separate the organic from the aqueous layer. Extract the aqueous phase twice with 100 parts by volume (each) of benzene. Unite all organic phases and wash same with 150 parts by volume of water followed by a wash with saturated (aq.) sodium chloride solution.

Dry the thus-washed organic phase over sodium sulfate. Filter same to obtain a clear colorless solution. Evaporate the clear solution in vacuo to obtain an oily residue, which crystallizes on standing in admixture with 75 parts by volume of pentane. Filter the crystals, and wash same with 25 parts by volume of pentane. Dry the crystals, and then recrystallize same from diethylether to obtain 12.6 parts of title compound, M.P. 142° to 144°.

Replacing the racemic 2-chloro-5-methyl-5,6,7,9,10,14b-hexahydro-isoquinolo[2,1-d]benzo[1,4]diazepin - 6 - one by an equivalent of either 2-bromo-5-ethyl-10-methyl-12,13 - dimethoxy - 5,6,7,9,10,14b-hexahydro-isoquinolo[2,1-d]benzo[1,4]diazepin-6-one or 2-amino-5-methyl-10 - ethyl - 13 - methoxy-5,6,7,9,10,14b-hexahydro-isoquinolo[2,1-d]benzo[1,4]diazepin-6-one results in the preparation, in similar manner, of the corresponding compound I.

EXAMPLE 9

Racemic 2-chloro-5,6,7,9,10,14b-hexahydro-isoquinolo[2,1-d]benzo[1,4]diazepine succinate

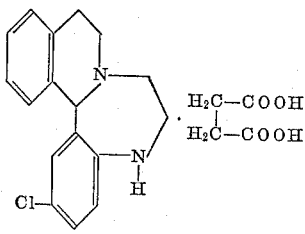

Dissolve 10 parts of racemic 2-chloro-5,6,7,9,10,14b-hexahydro-isoquinolo[2,1-d]benzo[1,4]diazepin - 6 - one in 450 parts by volume of absolute toluene. Add the resulting solution in 50-part-by-volume portions (one every 5 minutes) to a refluxing suspension of 8 parts of lithium aluminum hydride in 250 parts by volume of diethylether. Continue heating for a total of 12 hours (with stirring) at a temperature of from 40° to 50°. Thereafter destroy excess lithium aluminum hydride by the addition (to the resultant) of 125 parts by volume of ethyl acetate, followed by the addition thereto of 250 parts by volume of water and sufficient (aq.) hydrochloric acid to render the produced aqueous phase clearly acidic. Then neutralize the aqueous phase with sodium hydroxide prior to separating the aqueous from the organic phase. Extract the separated aqueous phase with 150 parts by volume of ethyl acetate. Wash the combined organic phases with saturated (aq.) sodium chloride solution, and dry the thus-washed organic phase over sodium sulfate. Evaporate the dried product in vacuo. Crystallize the residue from diethylether/pentane, and filter off 6.8 parts of the free base of the title compound. Dissolve 5 parts of the thus-obtained crude crystals, M.P. 133° to 138°, in 50 parts by volume of ethanol, and mix the resulting solution with a solution of 2.3 parts of succinic acid in 50 parts by volume of ethanol. The salt (title compound) crystallizes on addition to the thus-produced mixture of 30 parts by volume diethylether. Recrystallize from ethanol/ethylacetate to obtain 5.7 parts of title compound, M.P. 157° to 159°.

Replacing the racemic 2-chloro-5,6,7,9,10,14b-hexahydro-isoquinolo[2,1-d]benzo[1,4]diazepin - 6 - one by an equivalent of either racemic 2-trifluoromethyl-5-methyl-10 - propyl - 12 - methoxy-5,6,7,9,10,14b-hexahydro-isoquinolo[2,1-d]benzo[1,4]diazephin-6-one or racemic 5-propyl - 10-methyl-12,13-methylenedioxy-5,6,7,9,10,14b-hexahydro-isoquinolo[2,1-d]benzo[1,4]diazepin - 6 - one results in the preparation, in similar manner, of the corresponding racemic compound I.

EXAMPLE 10

Racemic 5-methyl-5,6,7,9,10,14b-hexahydro-isoquinolo[2,1-d]benzo[1,4]diazepine succinate

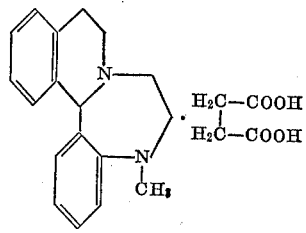

Extract twice with 100 parts by volume of benzene (each) a mixture of 10 parts of 5-methyl-5,6,7,9,10,14b-hexahydro-isoquinolo[2,1-d]benzo[1,4]diazepine - 6 - one hydrochloride with 50 parts by volume of 2 N (aq.) sodium hydroxide solution. Wash the thus-prepared benzene phase with saturated (aq.) sodium chloride solution. Dry the resultant and evaporate same in vacuo.

Dissolve the thus-obtained 9 parts of oil in 100 parts by volume of absolute benzene. Add the resulting solution dropwise to a boiling suspension of 10 parts of lithium aluminum hydride in 250 parts by volume of diethylether. Reflux the thus-produced reaction mixture for 6 hours.

Thereafter, destroy (in situ) any excess lithium aluminum hydride (under nitrogen) with water. Then add to the refluxed material 200 parts by volume of diethlether and 100 parts by volume of benzene. Extract the resultant mixture with saturated (aq.) sodium chloride solution. Separate the obtained organic phase, dry same over sodium sulfate, and evaporate in vacuo to obtain 7 parts of oil which is the free base of the title compound.

Dissolve 5 parts of said free base in 30 parts by volume of ethanol. Admix the resulting solution with a solution of 2.5 parts of succinic acid in ethanol. Cool the product to crystallize out 5.5 parts of title compound. Recrystallize from ethanol/ethyl acetate to obtain 4.8 parts of title compound, M.P. 123° to 124°.

EXAMPLE 11

2-chloro-5,10-dimethyl-5,6,7,9,10,14b-hexahydro-isoquinolo[2,1-d]benzo[1,4]diazepine succinate

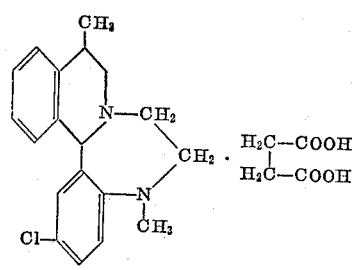

(a) N-(2-phenylpropyl)-2-methylamino-5-chlorobenzamide

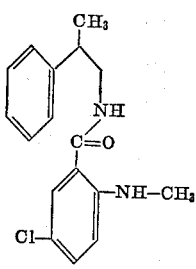

Heat the mixture of 2 parts of 5-chloro-N-methyl-isatoic anhydride and 1.6 parts of 2-phenylpropylamine in 10 parts by volume of dioxane for 15 minutes on a water bath, whereby vigorous carbon dioxide evolution takes place. Add water to the obtained solution to precipitate 3 parts of (a), M.P. 100° to 103°.

(b) Tosylate of (a)

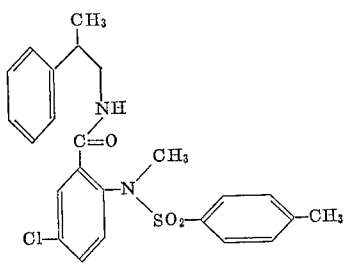

Add 1 part of p-toluenesulfonyl chloride to the solution of 0.8 part of (a) in 2.5 parts by volume of pyridine, and heat the obtained mixture at 60° for 1.5 hours. Evaporate the resultant in vacuo, add 3 parts by volume of acetone and 1 part by volume of water to the product, and shake the obtained reaction mixture for 30 minutes. After evaporation of the acetone, add ethyl acetate to the remainder and extract the organic layer thoroughly with dilute hydrochloric acid and sodium bicarbonate solution. Dry the organic phase over sodium sulfate and evaporate the thus-dried organic phase to dryness to obtain 1 part of (b), M.P. 89° to 91° with decomposition.

(c) 1-(2-methyltosylamino-5-chlorophenyl)-4-methyl-3,4-dihydroisoquinoline hydrochloride

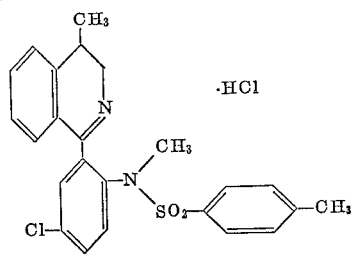

Add 10 parts of the tosylate (b) to 43 parts by volume of phosphorus oxychloride and reflux the resulting mixture for 15 hours. Cool the refluxed product to room temperature and evaporate in vacuo. Dissolve the obtained residue in 300 parts of volume of methylene chloride. Wash the thus-prepared solution first with ice-cold 1 N (aq.) sodium hydroxide (2 washings with approximately 120 parts by volume of the sodium hydroxide solution for each) then with water and finally with saturated (aq.) sodium chloride solution.

Dry the thus-washed organic phase over sodium sulfate and evaporate the obtained solution in vacuo. Dissolve the residue in 60 parts by volume of acetone, and saturate the resulting solution with dry hydrogen chloride gas. Add 30 parts by volume of diethylether to the saturated solution to precipitate 5.2 parts of (c), M.P. 254°.

(d) 1-(2-methylamino-5-chlorophenyl)-4-methyl-3,4-dihydroisoquinoline

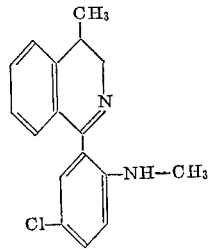

Gradually add 100 parts by volume of concentrated sulfuric acid (with cooling) to 46 parts of (c), and maintain the obtained solution at room temperature over night. Pour said solution onto ice; make it alkaline with sodium hydroxide; and extract the alkaline solution with methylene chloride. Dry and evaporate the organic solvent to obtain 20 parts of (d), M.P. 108° to 110°.

(e) 1-(2-methylamino-5-chlorophenyl)-4-methyl-1,2,3,4-tetrahydroisoquinoline

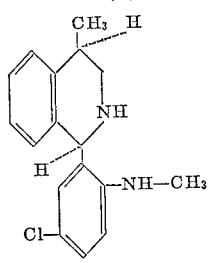 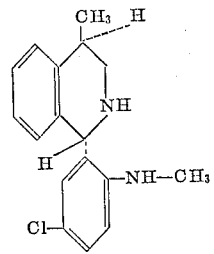

"cis" (as racemic mixture)   "trans" (as racemic mixture)

Suspend 18.5 parts of (d) in 200 parts by volume of 95% ethanol, add 7 parts of sodium borohydride to the obtained suspension, and reflux the resultant for 1 hour. Cool the refluxed product to room temperature, and then acidify with 2 N hydrochloric acid. Thereafter add 2 N (aq.) sodium hydroxide until the pH of the obtained solution is about 9. Evaporate in vacuo to one third of volume. Extract the concentrated solution twice with water and saturated sodium chloride solution, dry the thus-washed material over sodium sulfate, and evaporate the dried resultant in vacuo to obtain an oily residue. Crystallize the oily residue from diethylether/pentane to obtain 14 parts of (e), "cis" form, M.P. 142° to 144°, and 2.2 parts of (e), "trans" form, M.P. (after recrystallization from diethylether/pentane) 81° to 84°.

(f) 1-(2-methylamino-5-chlorophenyl)-2-carbomethoxymethyl-4-methyl-1,2,3,4-tetrahydroisoquinoline

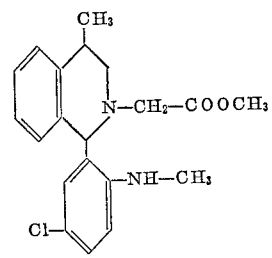

Dissolve 2 parts of (e), "cis" form, in 20 parts by volume of absolute ethanol, and mix the obtained solution with 1.7 parts of methyl bromoacetate and 2 parts of triethylamine. Reflux the resulting mixture for four hours. Then evaporate the solvent.

Mix the residue with 200 parts by volume of ethylacetate and 100 parts by volume of water; separate the phases; extract the aqueous phase twice with 100 parts by volume (each) of ethylacetate; unify the organic phases and wash them with water and saturated sodium chloride solution; dry the thus-treated organic phases over sodium sulfate; and evaporate the dried organic phases in vacuo.

Crystallize the residue by admixture with 75 parts by volume of a 1:1 mixture of benzene and pentane. Filter the precipitated crystals to obtain 1 part of (f), "cis" form, M.P. 111° to 113°.

(g) 1-(2-methylamino-5-chlorophenyl-2-carboxymethyl-4-methyl-1,2,3,4-tetrahydroisoquinoline

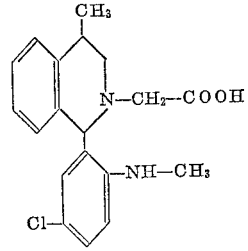

Dissolve 2 parts of (f) "cis" form, in 10 parts by volume of ethanol. Mix the obtained solution with 10 parts by volume of 1 N (aq.) sodium hydroxide. Reflux the resulting mixture for 1 hour. Cool the resultant to room temperature. Then admix same with 10 parts by volume of 1 N hydrochloric acid. Filter and dry precipitated crystals to obtain (g), "cis" form, M.P. 260° to 266°.

(h) 2-chloro-5,10-dimethyl-5,6,7,9,10,14b-hexahydro-isoquinolo[2,1-d]-benzo[1,4]diazepin-6-one

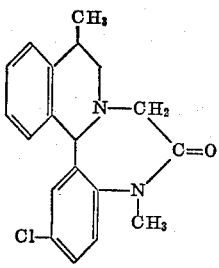

Heat 2 parts of (g), "cis" form, for 40 minutes at 200°. Crystallize the resulting product from a mixture of 5 parts by volume of methylene chloride and 10 parts by volume of diethylether to obtain the "cis" form, M.P. 179° to 181°, of (h).

Alternatively, dissolve 10 parts of (f), "trans" form, in a solution of 0.1 par tof metallic sodium in 100 parts by volume of methoxyethanol. Reflux the resultant for 1 hour. Cool same to room temperature and evaporate the solvent therefrom in vacuo. Dissolve the crystalline residue in 150 parts by volume of methylene chloride, and extract the obtained solution twice with 50 parts by volume (each) of water. Dry the thus-washed product over sodium sulfate; evaporate the solvent to about 30 parts by volume. Add to the concentrate 100 parts by volume of diethylether. Filter the formed crystals and wash same with diethylether. There are thus obtained 7 parts of the "trans" form, M.P. 187° to 189°, of (h).

In the same manner the corresponding "cis" form, M.P. 179° to 181°, of (h) is obtained from the "cis" form of (f).

(i) Reduction with lithium aluminum hydride to form the free base of the title compound In a Soxhlet apparatus place 3.3 parts of (h), "cis" form, in the Soxhlet thimble prior to refluxing for 20 hours a suspension of 2 parts of lithium hydride in 300 parts by volume of absolute diethylether in the Soxhlet flask. All of the compound in the thimble is dissolved and transported to said flask prior to this time.

Destroy excess lithium aluminum hydride in situ (under a nitrogen atmosphere) with water. Thereafter, add to the refluxed material 200 parts by volume of diethylether and 100 parts by volume of benzene. Extract the resultant mixture with saturated (aq.) sodium chloride solution. Separate the obtained organic phase, dry same over sodium sulfate, and evaporate in vacuo to obtain 3 parts of yellow oil, which is the free base of the "cis" form of the title compound.

(j) Preparation of acid addition salt (title compound) from free base

Dissolve the free base of the "cis" form of the title compound in 30 parts by volume of ethanol. Mix the resulting solution with a solution of 1.37 parts of succinic acid in ethanol. Add to the product 15 parts by volume of diethylether to crystallize out the title compound. Filter the crystals and recrystallize same (twice) from ethanol/ethyl acetate to obtain 2.2 parts of the "cis" form of the title compound, M.P. 158° to 160°.

Replacing the "cis" form with the corresponding "trans" form in (i) and (j) results in the preparation, in the same manner, of the "trans" form of the title compound.

EXAMPLE 12

2-chloro-5-methyl-5,6,7,9,10,14b-hexahydro-isoquinolo[2,1-d]benzo[1,4]-diazepine-6-thione

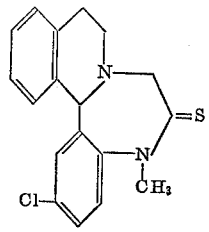

Dissolve 10 parts of 2-chloro-5-methyl-5,6,7,9,10,14b-hexahydroisoquinolo[2,1-d]benzo[1,4]diazepin-6-one in 150 parts by volume of pyridine, and reflux the resulting solution with 8.5 parts of phosphorus pentasulfide for 3 hours. Evaporate the resultant in vacuo to dryness, suspend the residue in methylene chloride, and admix the obtained usupension with 2 N (aq.) sodium hydroxide solution. Wash the organic (methylene chloride) phase with water, and dry the thus-washed phase over sodium sulfate prior to evaporating same in vacuo.

Dissolve the produced residue in methylene chloride, and admix the methylene chloride solution with an excess of ethanolic hydrochloric acid. On addition of diethylether to the resultant, 7.2 parts of the hydrochloride, M.P. 242° to 244°, of the title compound crystallize out.

The title compound (free base) is freed from the the hydrochloride according to standard procedure. On recrystallization from methylene chloride/diethylether, the title compound has a melting point of 190° to 195°.

This example is illustrative of preparing compounds III. (See reaction A.) Compounds III are reduced to corresponding compounds I by hydrogenation with Raney nickel as catalyst according to well-established standard procedures.

The invention is readily understood from the preceding description. Various changes may be made in the intermediates, in the free bases I and in their pharmaceutically acceptable acid addition salts without departing from the spirit and scope of the invention or sacrificing its material advantages. The starting materials, intermediates, free bases and acid addition salts set forth hereinbefore are merely illustrative embodiments.

What is claimed is:

1. A product which is a member selected from the group consisting of a compound of the general formula:

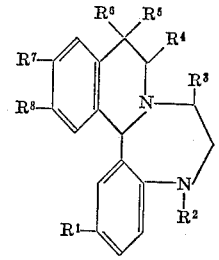

wherein
R¹ is a member selected from the group consisting of a hydrogen atom; lower alkyl; a halogen atom; amino; di(lower)alkylamino, both alkyls of which are alike; and trifluoromethyl;
$R_2$ is a member selected from the group consisting of a hydrogen atom; lower alkyl; benzyl; and di(lower)alkylamino(lower)alkyl;
each of
$R^3$, $R^4$, $R^5$ and $R^6$ is a member selected from the group consisting of a hydrogen atom; and straight chain lower alkyl; and
each of
$R^7$ and $R^8$ is, independently, a member selected from the group consisting of a hydrogen atom and methoxy; and, taken together, methylenedioxy; and an acid addition salt of said compound, with the proviso that when one of $R^3$ and $R^4$ is lower alkyl, the other is a hydrogen atom; and when $R^4$ is lower alkyl, each of $R^5$ and $R^6$ is, independently, either a hydrogen atom or methyl.

2. 2 - chloro - 5-methyl-5,6,7,9,10,14b-hexahydro-isoquinolo-[2,1-d]benzo[1,4]diazepine.

3. 2-chloro-5,6,7,9,10,14b-hexahydro-isoquinolo[2,1-d]benzo[1,4]diazepine.

4. 5 - methyl - 5,6,7,9,10,14b-hexahydro - isoquinolo [2,1-d]benzo[1,4]diazepine.

5. 2 - chloro - 5,10-dimethyl-5,6,7,9,10,14b-hexahydro-isoquinolo[2,1-d]benzo[diazepine.

6. 2 - chloro - 5-methyl-5,6,7,9,10,14b-hexahydro-isoquinolo[2,1-d]benzo[1,4]diazepine tartrate.

7. 2-chloro-5,6,7,9,10,14b-hexahydro-isoquinolo[2,1-d]benzo[1,4]diazepine succinate.

8. 5-methyl-5,6,7,9,10,14b-hexahydro-isoquinolo[2,1-d]benzo[1,4]diazepine succinate.

9. 2 - chloro - 5,10-dimethyl-5,6,7,9,10,14b-hexahydro-isoquinolo[2,1-d]benzo[1,4]diazepine succinate.

10. (+) - 2-chloro-5-methyl-5,6,7,9,10,14b-hexahydro-isoquinolo[2,1-d]benzo[1,4]diazepine tartrate.

11. (—) - 2-chloro-5-methyl-5,6,7,9,10,14b-hexahydro-isoquinolo[2,1-d]benzo[1,4]diazepine tartrate.

12. Cis - 2 - chloro-5,10-dimethyl-5,6,7,9,10,14b-hexahydro-isoquinolo[2,1-d]benzo[1,4]diazepine succinate.

References Cited

Burger Medicinal Chemistry, 2nd edition, Interscience, 1960, pp. 42–3.

ALEX MAZEL, *Primary Examiner.*

D. G. DAUS, *Assistant Examiner.*

U.S. Cl. X.R.

167—65; 260—288, 239.3, 287, 558